United States Patent [19]
Butler, Jr.

[11] 3,958,453
[45] May 25, 1976

[54] GASOLINE MILEAGE INDICATOR SYSTEM

[76] Inventor: Farrell G. Butler, Jr., P.O. Box 763, Pearland, Tex. 77581

[22] Filed: Nov. 8, 1974

[21] Appl. No.: 522,061

[52] U.S. Cl. ................................................. 73/114
[51] Int. Cl.² ......................................... G01M 15/00
[58] Field of Search ............................ 73/114, 113, 3

[56] References Cited
UNITED STATES PATENTS

| | | | |
|---|---|---|---|
| 1,401,315 | 12/1921 | Clark | 73/114 |
| 1,503,552 | 8/1924 | Parker | 73/114 |
| 1,533,530 | 4/1925 | Wheatley et al. | 73/114 |
| 1,917,974 | 7/1933 | Inglis et al. | 73/114 |
| 3,204,452 | 9/1965 | Sorenson et al. | 73/114 |
| 3,308,655 | 3/1967 | Nichols | 73/114 |

Primary Examiner—James J. Gill
Assistant Examiner—Anthony V. Ciarlante
Attorney, Agent, or Firm—Beall & Jeffery

[57] ABSTRACT

A gasoline mileage indicator system gives instantaneous mileage readings. A sending unit attached to a flowmeter in the fuel line provides a signal to a gauge which registers fuel flow. One disc calibrated in miles per gallon is fastened to the speedometer needle shaft, and another disc having an indicator is fastened to the shaft of the fuel flow gauge. The discs are aligned so that the indicator on the fuel flow gauge disc will point to the proper miles-per-gallon calibration on the speedometer disc.

8 Claims, 6 Drawing Figures

GASOLINE MILEAGE INDICATOR SYSTEM

BACKGROUND OF THE INVENTION

Heretofore it has been known that there are various types of instruments and attempts made to provide a simplified fuel consumption device which will read out in terms of miles per gallon.

For example, U.S. Pat. Nos. 1,533,530, 3,204,452 and 3,635,079 disclose such devices. While the inventions described in these and other patents are adequate to provide the desired output of miles per gallon, there are a number of disadvantages inherent in the designs thereof. All of the prior art attempts require complex, specially manufactured apparatus and would not be easly adaptable for use with readily available components.

SUMMARY OF THE INVENTION

It is accordingly an object of the present invention to provide a novel and useful gasoline mileage indicator.

It is another object of the invention to provide a gasoline mileage indicator of simple construction which can be manufactured from components which are of conventional design and are commercially available.

Another object of the present invention is to provide a gasoline mileage indicator which is reliable, easy to read, and of dependable design.

It is yet a further object of the invention to provide a gasoline mileage indicator apparatus which utilizes the ordinary speedometer apparatus of a vehicle without interfering with its operation, so as to permit installation of the mileage indicator apparatus in an existing vehicle.

DESCRIPTION OF THE PREFERRED EMBODIMENTS

Figure 1:
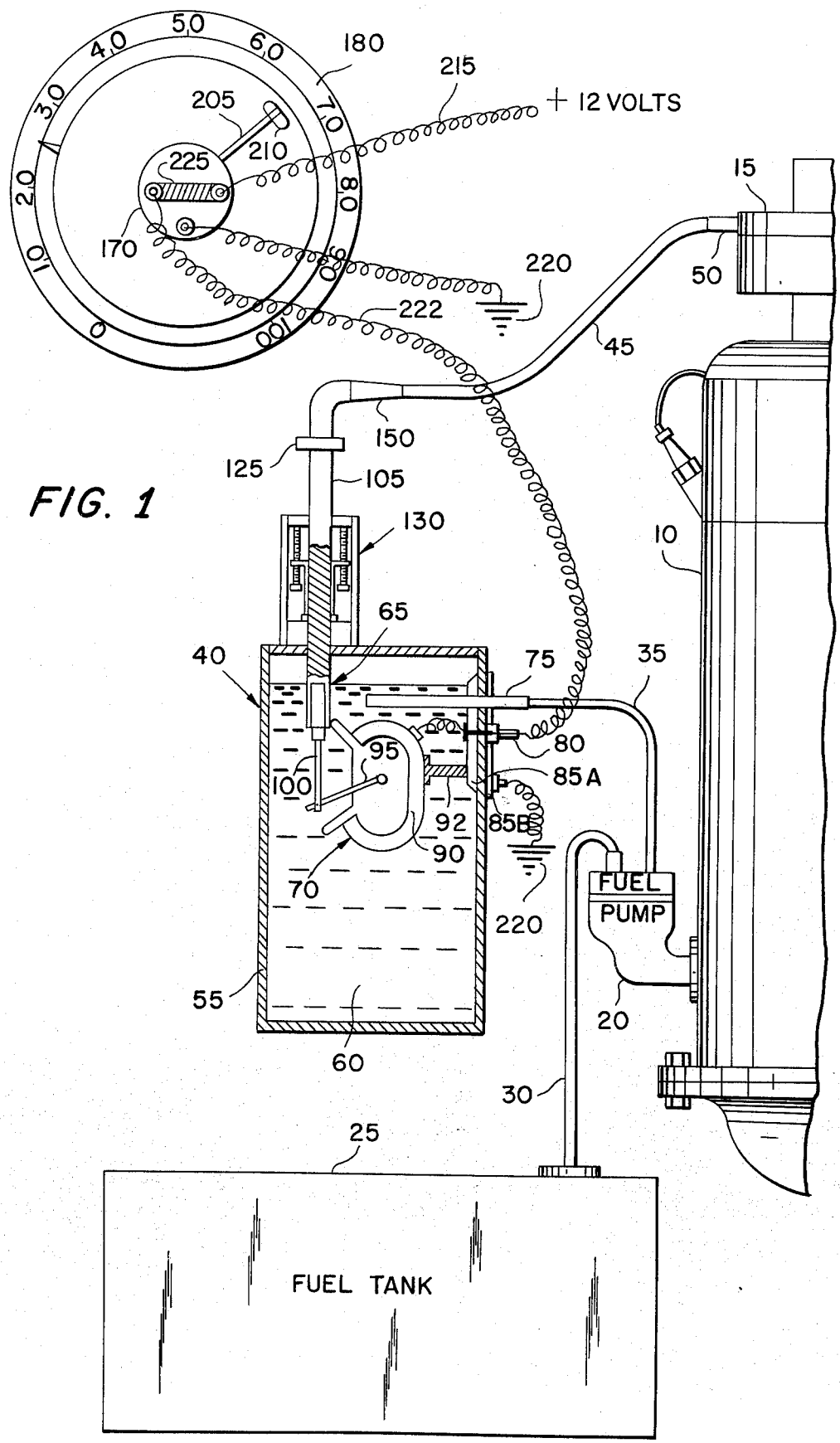
FIG. 1 is a schematic diagram of the gasoline mileage indicator system components in relation to the vehicle fuel system and electrical systems.
Figure 2:
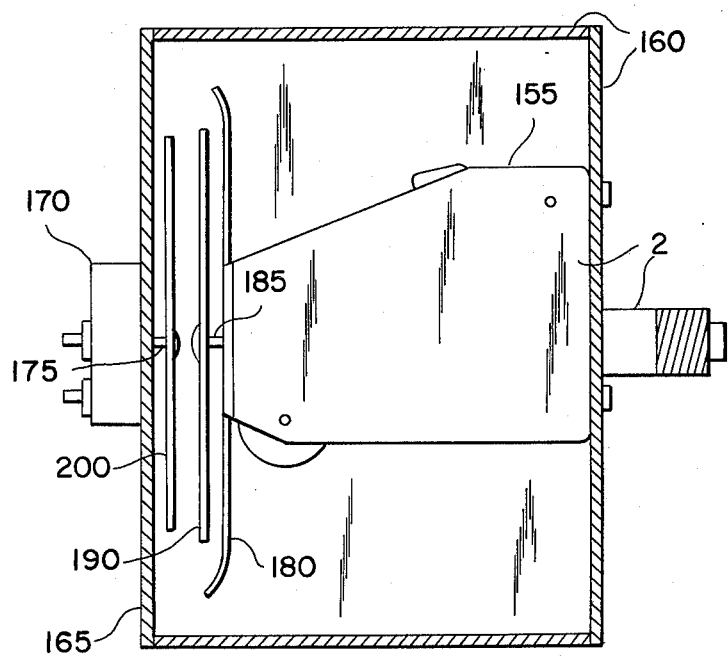
FIG. 2 is a side elevational view illustrating the fuel flow gauge in relation to the speedometer.
Figure 3A:
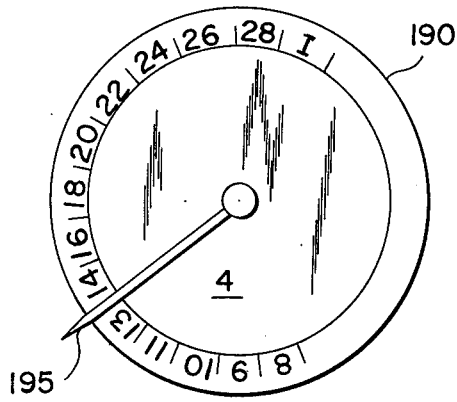
FIGS. 3A, 3B and 3C show the calibrated discs which attach to the speedometer shaft, the fuel flow gauge shaft and the speedometer body, respectively.
Figure 3B:
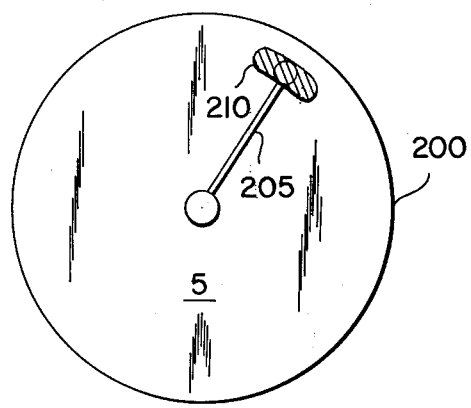
Figure 3C:
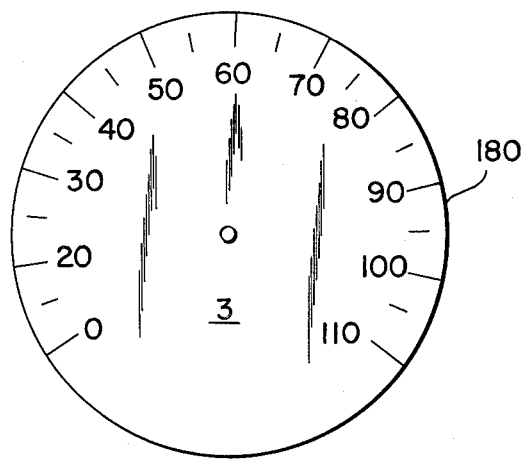

Referring now to FIG. 1, there is shown therein an automobile engine 10 having a carburetor 15, a fuel pump 20, a fuel tank 25 and a fuel line 30 connecting the tank to the fuel pump. A fuel line 35 connects the fuel pump to a fuel flow meter assembly indicated generally at 40, and a fuel line 45 connects the assembly 40 to the carburetor fuel intake 50. With the exception of the flow meter assembly 40, the foregoing components are of a type found in most conventional motor vehicles and are well known to those skilled in the art.

Figure 4:
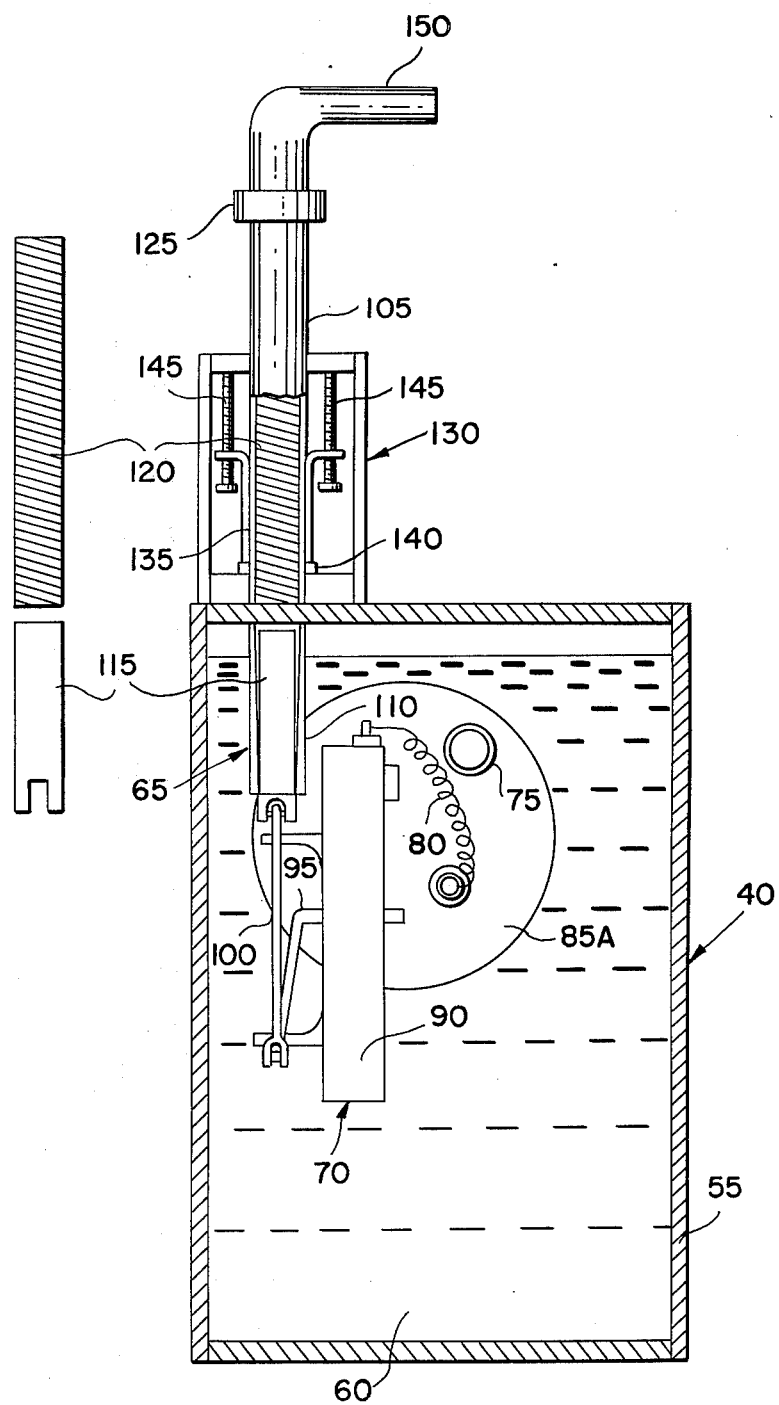
FIG. 4 shows in greater detail the fuel flow meter and sending apparatus in a cutaway view at right angles to the view of FIG. 1.

Referring to FIGS. 1 and 4, the fuel flowmeter assembly 40 comprises leak-proof housing 55 containing a quantity of gasoline 60, a flowmeter generally indicated at 65, and a signal sending device generally indicated at 70. Sending device 70 comprises two bracket plates 85A and 85B, a fuel inlet 75 passing through housing 55 and through the bracket plates, a variable resistor (not shown) in a sealed enclosure 90, a brace 92 connecting enclosure 90 to plate 85A, a wiper arm 95, a push rod 100 connected to the wiper arm, and an insulated conductor 80. The bracket plates 85A and 85B are electrically conductive as are brace 92 and enclosure 90, and all are in mutual electrical contact. A conventional wire-wound or other type variable resistor, well known to those skilled in the art, is encased in and has one terminal electrically connected to enclosure 90. The wiper contact of the resistor is attached to wiper arm 95 and connected to insulated conductor 80. It can be seen that this arrangement provides a variable resistance between conductor 80 and plates 85A and 85B, the resistance being dependent on the position of the wiper arm. The sending device is generally available as a unit used, for example, in General Motors vehicles, for indicating the level of a float in the fuel tank.

The fuel flowmeter apparatus 65, shown partially cutaway in FIGS. 1 and 4, is of a general type known to those skilled in the art. Flowmeter 65 comprises a vertically movable copper tube 105 passing through the top of housing 55, with an inwardly tapered lower end 110. A cylindrical piston 115 is positioned inside the tube and connected to push rod 100. Housing 55 may be constructed of any suitable material impervious to fuel. In a preferred embodiment it is made of glass or other transparent material.

Above the piston 115 is a lightweight copper spring 120 which abuts a flange 125 extending within the tube, biasing the piston in a downward direction. Attached to the top of housing 55 is a frame generally indicated at 130 within which is located a rigid collar 135 and an O-ring 140 around tube 105. The O-ring is made of a resilient material such as neoprene. Adjusting bolts 145 extend through threaded openings in flange 146 of the collar, and are adapted to engage the top wall of the frame thereby pressurizing the O ring. When screws 145 are loosened, the pressure on O ring 140 is released and tube 105 may be freely moved vertically to calibrate the sending device. By tightening screws 145 against the frame 130, tube 105 is held firmly in place by the collar 135 pressing O-ring 140 against the tube. The flowmeter has an outlet 150 at the top of tube 105 which communicates, as above note, with the carburetor.

A preferred visual readout portion of the invention is shown in FIGS. 1, 2 and 3A–3C. A conventional speedometer 155, well known in the art, is mounted in a casing 160 having a translucent front wall 165. The casing may be of sheet steel and the front wall of plexiglass, for example. On the frontwall is attached a gauge 170 with a rotatable shaft 175 passing therethrough. Gauge 170 may be either an ammeter or a voltmeter, although in the present description only a voltmeter is described. The speedometer has a plate 180 (FIG. 3C) firmly fastened to it, the plate having conventional miles-per-hour divisions on it. Shaft 185 of speedometer 155 has its conventional indicator needle replaced with an indicator disc 190 (FIG. 3A) having numbers around its periphery representative of miles-per-gallon and an integrally fashioned indicator needle 195 projecting outwardly radially. A third disc 200 having a radial slot 205 projecting from the center out to an oval shaped slot 210 at the periphery is attached to gauge shaft 175. The discs are preferably manufactured from a thin, sheet-like material such as polyethylene, a vinyl or sheet metal, and have their indicia facing in the direction of gauge 170 in FIG. 2.

Referring now to FIG. 1, the electrical interconnection of the components is shown. One terminal of gauge 170 is connected by wire 215 to the voltage supply of the vehicle's electrical system, in this case +12 volts, while a second terminal of the gauge is connected to the vehicle chassis or "ground" 220 of the electrical system. To a third terminal of the gauge a wire 222 is connected to insulated conductor 80 from sending device 70. The schematic diagram of such a circuit is well known in the art and, for that reason, is not illustrated here.

Referring now to the operation of the apparatus, fuel pump 20 draws fuel from tank 25 and delivers it to housing 55 through inlet 75. As fuel is drawn through flowmeter 65 to carburetor 15, piston 115 is pulled upwardly against the bias of spring 120 in the tapered section 110 of tube 105 by the flow of fuel. At a steady rate of flow, piston 115 is stationary, but as the flow rate goes up or down the piston moves up or down, resectively. With each position of the piston is associated a given resistance of sending device 70. As the piston moves, the resistance between conductor 80 and "ground" varies. This resistance is shown connected in a voltage divider circuit from +12 volts, through a fixed resistor 225, FIG. 1, and through the sending device resistance to "ground." Gauge 170 measures the voltage from conductor 80 to "ground" and rotates disc 200 in dependence on the measured voltage. The speedometer 155 operates in its normal manner except that it rotates disc 190 instead of a needle in dependence on the speed of the vehicle.

The vehicle driver can "read" the instantaneous gasoline mileage of the vehicle on disc 190 through slot 210 of disc 200. As the vehicle speed increases, disc 190 will tend to rotate clockwise and needle 195 will indicate vehicle speed against the backdrop of disc 180. As gasoline consumption increases, disc 200 will tend to rotate counterclockwise and the numbers on disc 190 visible through slot 210 will decrease in value.

For calibration purposes, a letter "I" is provided on disc 190. With the vehicle engine idling, screws 145 are loosened temporarily while tube 105 is vertically adjusted. When the letter "I" appears through slot 210 of disc 200, screws 145 are tightened and the calibration procedure is complete.

It is apparent from the foregoing description that the vehicle driver can obtain reliable indications of both instantaneous speed and gasoline mileage by glancing at only one instrument. It is also apparent that the invention overcomes many difficulties of prior art patents by providing a miles per gallon device that utilizes commercially available components and is easily installed on a conventional automobile to give a reliable interpretation of fuel consumption. It is to be understood that the foregoing description of the invention is merely illustrative and that many modifications thereof are possible within the spirit and scope of the invention.

I claim:

1. An instantaneous mileage indicator system for a motor vehicle, including
   a. fuel line means for supplying fuel to the vehicle engine,
   b. a float device connected to said fuel line means and having a float member which changes position in dependence on the flow rate of fuel passing through said fuel line means,
   c. signal sending means connected to said float member for providing an electrical signal representative of said flow rate of fuel,
   d. electrical gauge means connected to said signal sending means for rotating a first shaft in dependence on said electrical signal,
   e. speedometer means connected to the drive train of said motor vehicle for rotating a second shaft in dependence on the speed of said motor vehicle,
   f. first disc means secured to said first shaft for providing a visual indication representative of said flow rate of fuel, and
   g. second disc means secured to said second shaft for providing a visual indication representative of said motor vehicle speed,
   said first and second discs being juxtaposed and at least one of said discs having indicating means thereon for providing a visual indication of the instantaneous value of the distance traveled by said vehicle per quantity of fuel supplied to said engine, said visual indication of said instantaneous value being dependent on relative rotation of said first and second discs, and said float member comprising a piston loosely positioned in a vertically movable tube mounted in a housing for the signal sending means, and spring means within said tube for biasing said piston downwardly in said tube, the increased fuel flow rate raising said piston against the bias of said spring means, said tube being dimensioned so that vertical movement of said tube effects calibration of said apparatus.

2. The apparatus of claim 1, wherein said electrical gauge means is a voltmeter.

3. The apparatus of claim 1, wherein said electrical gauge means is an ammeter.

4. The apparatus of claim 1, wherein said signal sending means is a variable resistor connected to a voltage source.

5. The apparatus of claim 1, wherein said second disc means has a number sequence located around the periphery thereof and wherein said first disc means has an opening therein and is aligned with said second disc so that said number sequence will appear through said opening, thereby providing a visual indication of said instantaneous value.

6. The apparatus of claim 1, wherein the inner surface of the bottom of said tube is downwardly and inwardly tapered.

7. The apparatus of claim 1, further including means for calibrating said indicator system by modifying the position of said tube, said calibrating means comprising a frame, a flanged collar around said tube within said frame, an O-ring at the bottom of said collar and around said tube, and adjustment screws carried by said flanged collar by means of which the collar can be vertically moved to depress said O-ring to engage and thus secure said tube in a vertically adjusted position.

8. The apparatus of claim 1, wherein said piston is operatively connected at its lower end to a rod which is in turn connected to a wiper arm to effect variable resistance of said electrical signal from said sending device.

* * * * *